April 28, 1970 J. R. HOGAN 3,508,768
FLEXIBLE HOSE COUPLING ASSEMBLY AND METHOD
OF MANUFACTURE THEREFOR
Filed Sept. 11, 1968 3 Sheets-Sheet 1

INVENTOR:
JOSEPH R. HOGAN

BY Parrott, Ball, Seltzer, Park
& Gibson
ATTORNEYS

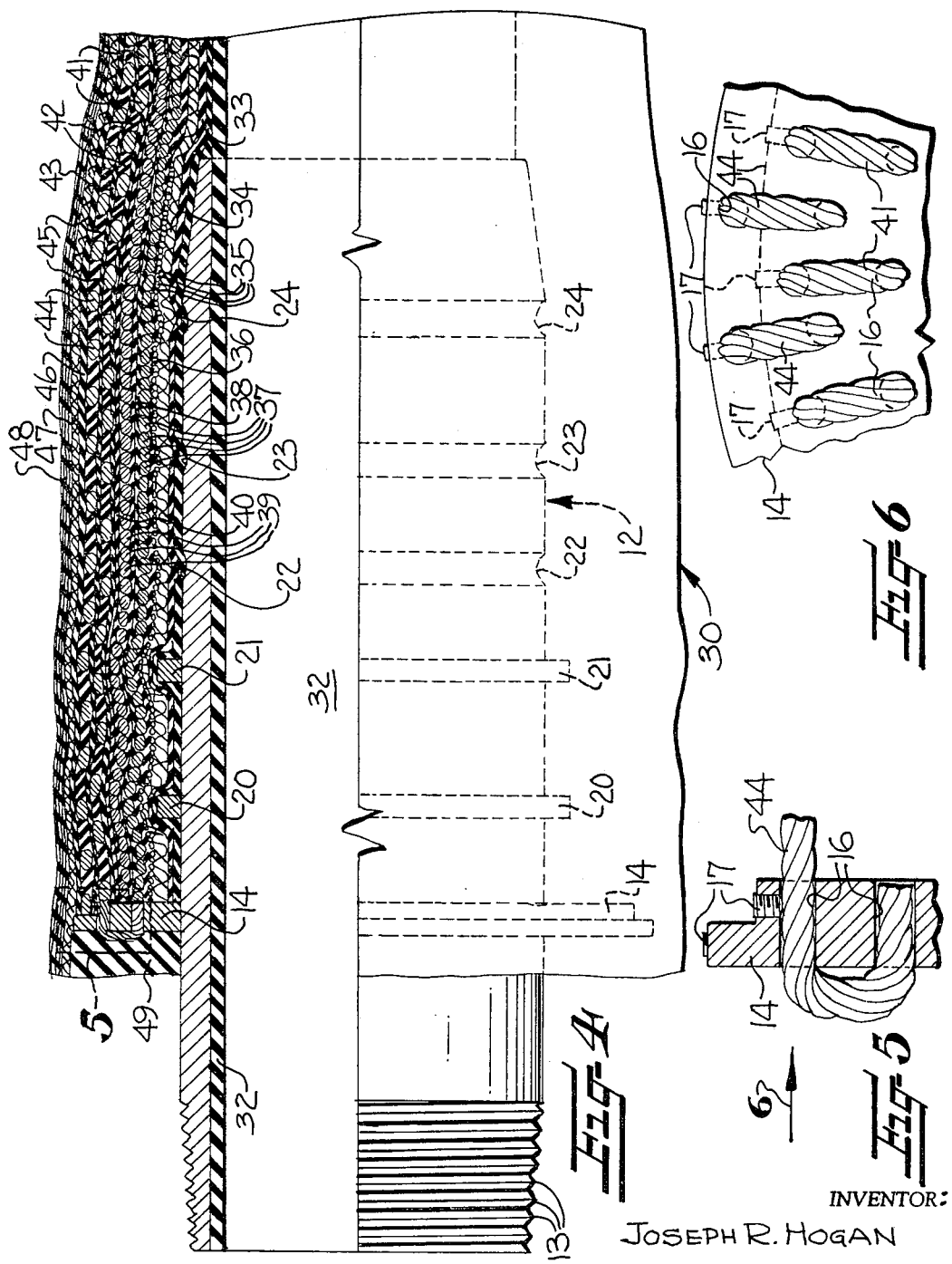

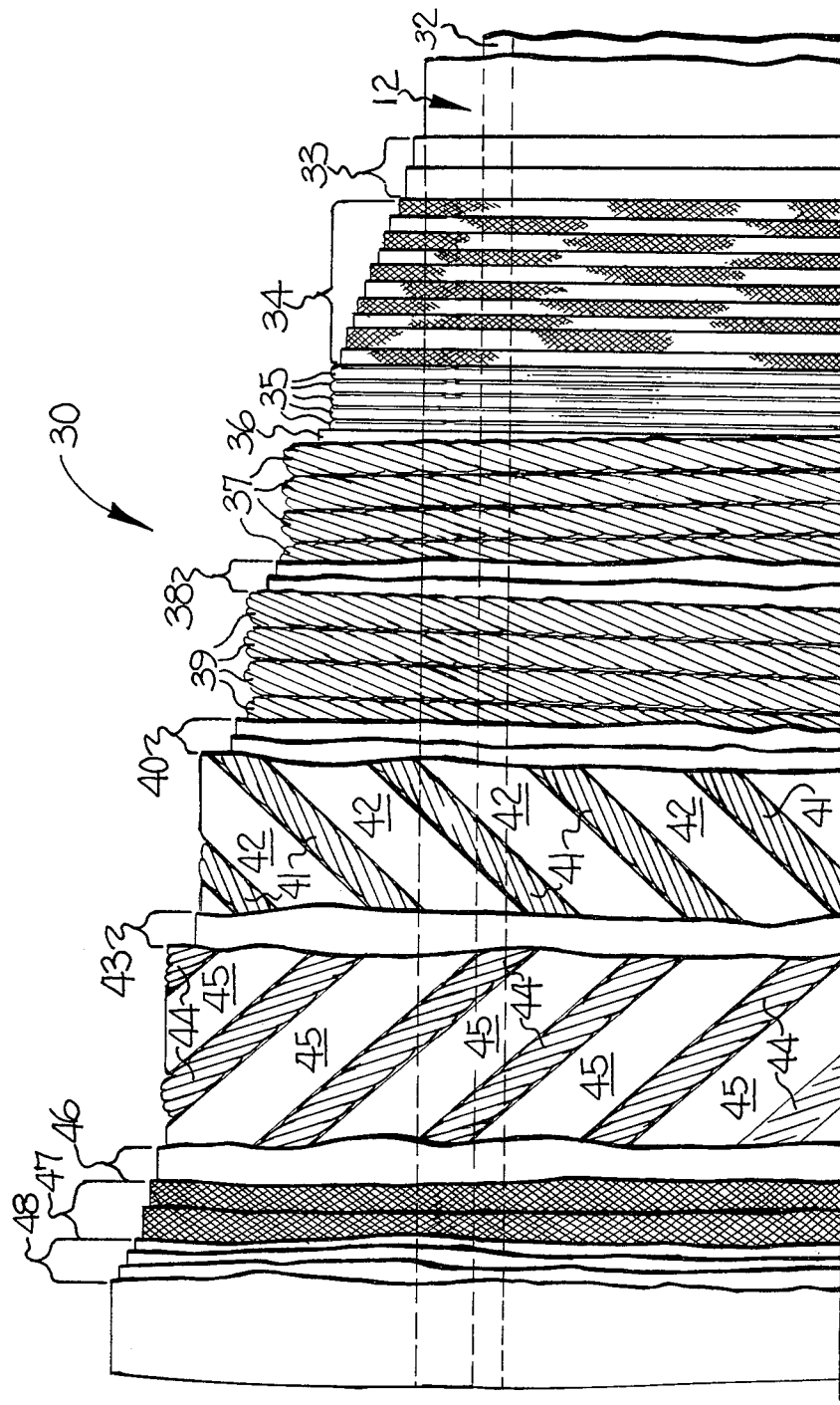

United States Patent Office 3,508,768
Patented Apr. 28, 1970

3,508,768
FLEXIBLE HOSE COUPLING ASSEMBLY AND METHOD OF MANUFACTURE THEREFOR
Joseph R. Hogan, Salisbury, N.C., assignor to Carolina Rubber Hose Company, a corporation of North Carolina
Filed Sept. 11, 1968, Ser. No. 759,128
Int. Cl. F16l 11/08, 33/22
U.S. Cl. 285—149                                       6 Claims

ABSTRACT OF THE DISCLOSURE

A flexible hose coupling assembly for use in high pressure drilling rigs, pipe laying rigs, etc., comprising hollow nipple means disposed on each end of the coupling assembly, and hollow flexible hose means secured to and extending between the nipple means for forming an integral coupling assembly. The hose means comprises a plurality of layers of material integrally secured together and collectively being of sufficient strength to withstand internal air pressures up to approximately 6000 pounds per square inch burst. The flexible hose coupling assembly is specifically constructed to prevent leakage of air between the nipple means and the hose means as the air passes through the coupling assembly, and, preferably, to provide a positive lock between spirally wound cable in the hose means and the nipple means.

---

This invention relates to a flexible hose coupling assembly and method of manufacture therefor and more specifically to a flexible hose coupling assembly for use in high pressure rotary drilling rigs, pipe laying rigs, etc., and which is specifically constructed to withstand internal pressures up to approximately 6000 pounds per square inch burst.

Flexible hose coupling assemblies for use in high pressure rigs of this type have, heretofore, been utilized and have comprised various layers of material secured together and anchored to metallic nipple means on the outer ends thereof for suitably connecting the coupling assembly into the type of rigs in which it is utilized. However, these prior coupling assemblies have all suffered from the common problem of fluid leakage between the flexible hose portion of the assembly and the rigid nipple means on the outer ends thereof. Also, while cable and other strength-imparting materials have been utilized for providing strength to the assembly for withstanding high internal pressures, a suitable hose coupling assembly for withstanding internal pressures up to 6000 pounds per square inch burst has not heretofore been satisfactorily produced. The prior assemblies have utilized cables including aircraft cables for imparting high degrees of strength thereto, but have not provided suitable connections between the cables and the metallic nipple means on each end thereof so as to avoid dislocation of the strength-imparting cables from the nipple means.

Accordingly it is the object of this invention to overcome the above-described problems of leakage between the rigid nipple means on each end of a high pressure hose coupling assembly and the flexible hose portion thereof and to provide a strong connection, which will not dislocate, between strength imparting aircraft cable utilized in the flexible hose portion and the rigid nipple means on each end of the assembly.

By this invention, the above problem of leakage between the flexible hose portion and the rigid nipple portion of the coupling assembly has been overcome by providing a flexible hose coupling assembly comprising hollow, elongate, generally cylindrical, rigid nipple means disposed on each end of the coupling assembly and including means for connecting the coupling assembly to the particular rig in which it is utilized; and elongate, hollow, flexible hose means secured to and extending between the nipple means for forming an integral coupling assembly. The hose means comprises a plurality of layers of material integrally secured together and collectively being of sufficient strength to withstand internal pressures up to approximately 6000 pounds per square inch burst. A first one of the layers of material extends internally into the nipple means and completely lines the internal surface thereof, and a second one of the layers of material extends over the outer surface of the nipple means and is integrally secured to the first layer of material to prevent air passing through the coupling assembly from leaking between the nipple means and the hose means.

The above problem of imparting sufficient strength to the coupling assembly and preventing dislocation of the connection between strength-imparting aircraft cable and the rigid flange means has been overcome by providing a flange means secured to the nipple means adjacent the outer end thereof and extending therefrom around the periphery thereof and including a plurality of spaced apertures therein disposed in spaced radially extending pairs around the flange means, and cooperating set screw means communicating with at least one of each of the radially extending pairs of apertures, so that the ends of spirally wound aircraft cable in the hose portion of the assembly may have the ends of each cable pass through one of the apertures and loop around and pass through the other of the apertures in a given pair of radially extending apertures in each of the flange means respectively with the set screw means securing the ends of the cable in the apertures on the flange means to prevent dislocation of the ends of the aircraft cable from the rigid nipple means.

Some of the objects and advantages of the invention having been stated, other objects and advantages will appear as the description proceeds when taken in conjunction with the accompanying drawings, in which:

FIGURE 4 is an enlarged, partial, side elevational view, broken away, of one end of the flexible hose coupling assembly of this invention;

FIGURE 5 is a cross-sectional view taken along the line 5—5 of FIGURE 4;

FIGURE 6 is a partial view taken along the line 6—6 of FIGURE 5; and

FIGURE 7 is a diagrammatic view of a portion of the hose means utilized in the hose coupling assembly of this invention illustrating the build-up of the various layers of material utilized therein.

Figure 1:
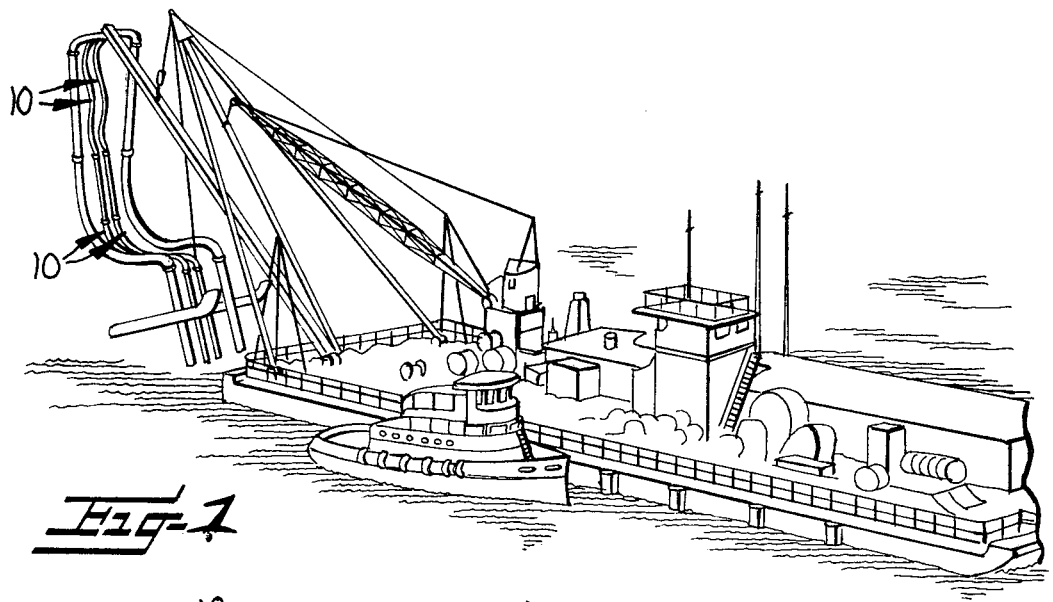
FIGURE 1 is a diagrammatic perspective view of a pipe laying rig utilizing the flexible hose coupling assembly of this invention.
Figure 2:
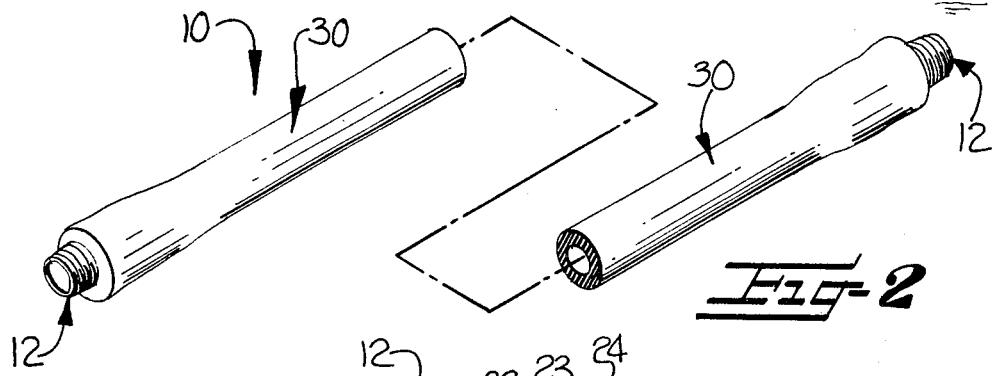
FIGURE 2 is a perspective view, broken away, illustrating the flexible hose coupling assembly of this invention.

Referring now to the drawings, the flexible hose coupling assembly of this invention is designated broadly therein by the reference numeral 10. These flexible hose coupling assemblies, as shown in FIGURE 1, may be used in conjunction with a conventional pipe laying rig wherein air under pressure is passed through conduits connected together by the couplings 10 to dig a trench along the ocean floor for the laying of pipe. This operation is well-known to those skilled in the art and need not be further described herein.

The flexible hose coupling assembly 10 of this invention comprises first a pair of hollow, elongate, generally cylindrical, rigid nipple means 12 disposed on each end of the coupling assembly 10 and including means 13, such as screw threads or the like, for connecting the coupling assembly 10 to the conduits or other portions of the particular rig in which the coupling assembly is being utilized. The nipple means 12 may be constructed of any suitable, rigid, strong material, such as steel or the like.

The nipple means 12 further includes a circular flange 14 adjacent the outer end thereof and extending radially therefrom around the periphery thereof and including a plurality of spaced apertures 16 therein disposed in spaced radially extending pairs, preferably alternately radially offset as shown in FIGURE 6, around said flange means. The flange means 14 further includes set screws 17 disposed in bores leading from the outer periphery and from an offset portion thereof and preferably communicating with one of each of the radially extending pairs of apertures.

Figure 3:
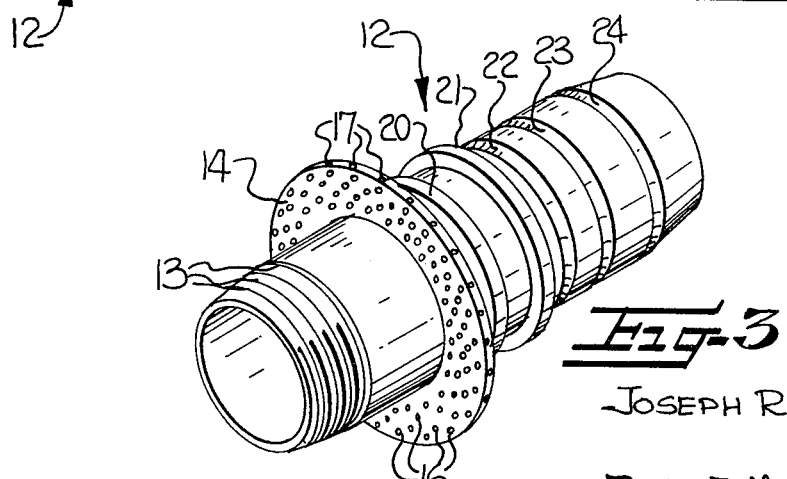
FIGURE 3 is a perspective view of the rigid nipple means utilized on each end of the flexible hose coupling assembly of this invention.

The nipple means 12 further includes radially extending circular projections 20 and 21 extending around the outside periphery thereof, as shown in FIGURES 3 and 4, and radially extending depressions 22, 23 and 24 extending around the outside periphery thereof, for purposes to be described hereinafter.

The flexible hose coupling assembly 10 further includes elongate, hollow, flexible hose means 30 secured to and extending between the nipple means 12 for forming an integral coupling assembly. The hose means 30 comprises a plurality of layers of material secured together and collectively being of sufficient strength to withstand internal air pressures up to approximately 6000 pounds per square inch burst.

The layers of material utilized in the flexible hose means 30 comprise alternate layers of synthetic rubber material, polyester fabric, copper-coated wire, and aircraft cable cemented and vulcanized together for forming an integral hose means. For the make-up of the layers of material in the hose means 30, reference may be had to FIGURES 4 and 7 and these layers of material will be specifically described below in connection with the method of forming the flexible hose coupling assembly 10.

In the manufacture of the flexible hose coupling assembly 10 of this invention, a synthetic rubber tube 32 of the desired length as the overall coupling assembly is extruded using a special high tensile 0.200″ ga. synthetic rubber compound. The synthetic rubber tube 32 is placed on a mandrel. A pair of rigid nipple means 12, as described above, are provided and the inside surface thereof is sandblasted and several coats of cement, including a special synthetic rubber cement, are successively applied letting each coat dry.

The cemented nipple means 12 are then placed over each end of the synthetic rubber tube 32 and air is blown into the tube so that the tube 32 is forced under pressure into contact with the nipple means 12 for bonding thereto. A coat of synthetic rubber cement is then applied over the outside surface of the synthetic rubber tube and the outside surface of the nipple means and dried.

Two plies of calendered synthetic rubber 0.065″ ga. sheet material 33 are then applied over the nipple means 12 and over the synthetic rubber tube 32. As may be seen particularly in FIGURE 4, this synthetic rubber sheet material 33 is secured in the depressions 22, 23, and 24 and over and around the projections 20 and 21 so as to prevent slippage of the synthetic rubber sheet material relative to the nipple means. Next, the assembly is wrapped with 2¼″ wide dry clean wrapping tape and left for approximately 15 minutes to compress the layers together and obtain a good bond or adhesion. The wrapping tape is then unwrapped and rerolled and the assembly is wiped with toluene and dried.

The assembly is then wrapped with ten plies of 20.8 oz. polyester fabric 34 cut on a 45° bias reversing each ply. Care must be taken to wrap the fabric tight enough to remove all air from the plies. Next, the end portions overlying the nipple means 12 are wrapped under tension with a layer of 0.080″ ga. high tensile copper-coated wire 35. The assembly is then wrapped with two plies of wet 2¼″ wide nylon tape under tension and placed in a vulcanizer and cured for one hour at 50 lbs. steam pressure, following which the assembly is cooled and the nylon tape is unwrapped and rerolled.

One coat of cement is then applied to the assembly and dried. Next, one ply of 0.065″ ga. synthetic rubber sheet material 36 is applied to the assembly, following which the assembly is wrapped with ¼″ diameter preformed galvanized dry spun aircraft cable 37 under 10 lbs. tension from right to left, as viewed in FIGURES 4 and 7. Two coats of cement are applied and dried. Two plies of calendered 0.065″ ga. synthetic rubber material 38 is then applied. Next, a layer of ¼″ diameter preformed galvanized dry spun aircraft cable 39 is wrapped under 10 lbs. tension from left to right, as viewed in FIGURES 4 and 7. Next, two plies of calendered 0.065″ ga. synthetic rubber material 40 is applied over the aircraft cable 39.

The assembly is then spirally wound at a 47° angle from right to left, as viewed in FIGURES 4 and 7, with a layer of ¼″ preformed galvanized dry spun aircraft cable 41. The total number of cables used is preferably 30 and each end of each cable is passed through one of the apertures 16, looped around and passed through in the opposite direction the other of the apertures 16 in a given pair of radially extending apertures in each of the flange means 14 of the nipple means 12, respectively. The set screws 17 are tightened onto the ends of the cables 41 to secure the same in place in the flange means 14 in a "Chinese finger" type arrangement, as shown in FIGURES 5 and 6.

The gaps between the spirally wound cables 41 are filled in with extruded ¼″ ga. by ½″ wide synthetic rubber strips 42. Next, one ply of calendered 0.065″ ga. synthetic rubber sheet material 43 is applied to the assembly.

Next, ¼″ diameter preformed galvanized dry spun aircraft cable 44 is spirally wound at a 47° angle from left to right, as viewed in FIGURES 4 and 7, under approximately 10 lbs. tension. Approximately 30 cables are spirally wound with the ends of each cable secured in the flange means 14 in the same manner as above-described in connection with the cables 41. The cables 44 are disposed in alternate inwardly disposed radial pairs of apertures, as indicated in FIGURE 6.

The gaps between the cables 44 are filled in with ¼″ ga. by ½″ wide extruded synthetic rubber strips 45 and one ply of calendered 0.065″ ga. synthetic rubber sheet material 46 is applied thereover. Next, two plies of 20.8 oz. polyester fabric 47 bias cut at 45° are wrapped around the assembly reversing the direction of each ply. Four plies of calendered 0.065″ ga. synthetic rubber sheet material 48 are then applied to the assembly. Next, 1″ wide end caps of 0.065″ ga. synthetic rubber strips 49 are built up enclosing the flange means 14, as indicated in FIGURE 4.

Next, the complete assembly is wrapped with six plies of wet 2¼″ wide nylon wrapping tape under tension and the assembly is cured two hours at 50 lbs. steam pressure in a vulcanizer. The assembly is cooled and the nylon tape is unwrapped and rewound. The assembly is then removed from the mandrel and the hose means 30 is burlap wrapped and protective caps are applied to the threads.

The above-described layers of material which are cemented and vulcanized together, are of sufficient strength to withstand internal pressures of approximately 6,000 pounds per square inch burst. Due to the novel construction of the assembly in having a layer of material completely lining the internal surface of the nipple means 12 and being integrally secured to a layer of material extending over the outer surface of the nipple means 12, leakage of air between the nipple means 12 and the hose means 30 is avoided. Also, by the novel "Chinese finger" arrangement of securing the cables 41 and 44 to the flange means 14 of the nipple means 12, dislocation of the hose means 30 from the nipple means 12 is prevented.

In the drawings and specification, there has been set forth a preferred embodiment of the invention, and although specific terms are employed, they are used in a generic and descriptive sense only and not for purposes of limitation, the scope of the invention being defined in the appended claims.

What is claimed is:

1. A flexible hose coupling assembly for use in high pressure rotary drilling rigs, pipe laying rigs, etc., and being specifically constructed to withstand internal pressures up to approximately 6,000 pounds per square inch burst, said coupling assembly comprising:
   (a) hollow, elongate, generally cylindrical, rigid nipple means disposed on each end of said coupling assembly and including means for connecting said coupling assembly to the rig, in which said nipple means further includes flange means secured thereto adjacent the outer end thereof and extending therefrom around the periphery thereof and including a plurality of spaced aperatures therein disposed in spaced radially extending pairs around said flange means and cooperating set screw means communicating with at least one of each of said radially extending pairs of apertures; and
   (b) elongate, hollow, flexible hose means secured to and extending between said nipple means for forming an integral coupling assembly, said hose means comprising a plurality of layers of material integrally secured together and collectively being of sufficient strength to withstand internal air pressures up to 6,000 pounds per square inch burst, a first one of said layers of material extends internally into said nipple means and completely lines the internal surface thereof and a second one of said layers of material extends over the outer surface of said nipple means and is integrally secured to said first layer of material to prevent air passing through said coupling assembly from leaking between said nipple means and said hose means, in which said layers of material in said hose means include aircraft cable spirally wound under pressure around other of said layers of material and having the terminal ends of each cable pass through one of said apertures and loop around and pass through the other of said apertures and terminate in a given pair of radially extending apertures in each of said flange means respectively with said set screw means securing the ends of said cables in the apertures on said flange means.

2. A flexible hose coupling assembly, as set forth in claim 1, in which said first and second layers of material in said hose means comprise synthetic rubber which are cemented and vulcanized to each other and to said nipple means.

3. A flexible hose coupling assembly, as set forth in claim 1, in which said layers of material in said hose means further include alternate layers of synthetic rubber material, polyester fabric, and copper-coated wire valcanized together for forming an integral hose means.

4. A flexible hose coupling assembly for use in high pressure rotary drilling rigs, pipe laying rigs, etc., and being specifically constructed to withstand internal pressures up to approximately 6,000 pounds per square inch burst, said coupling assembly comprising:
   (a) hollow, elongate, generally cylindrical, rigid nipple means disposed on each end of said coupling assembly and including means for connecting said coupling assembly to the rig; and
   (b) elongate, hollow, flexible hose means secured to and extending between said nipple means for forming an integral coupling assembly, said hose means comprising a plurality of layers of material integrally secured together and collectively being of sures up to approximately 6000 pounds per square inch burst, said layers of material comprising
   (1) an extruded synthetic rubber tube extending into and completely lining the internal surfaces of each of said nipple means and being of sufficient length of space said nipple means apart and form a flexible portion therebetween,
   (2) synthetic rubber sheet material wrapped around said synthetic rubber tube and extending over the outer surfaces of said nipple means and integrally secured to said synthetic rubber tube to prevent air passing through said coupling assembly from leaking between said nipple means and said hose means,
   (3) polyester fabric wrapped around said synthetic rubber sheet material,
   (4) copper-coated wire wrapped around the end portions of the assembly overlying said nipple means,
   (5) synthetic rubber sheet material wrapped around said copper-coated wire,
   (6) aircraft cable wrapped around said last named synthetic rubber sheet material,
   (7) synthetic rubber sheet material wrapped around said aircraft cable,
   (8) aircraft cable wrapped around said last named synthetic rubber sheet material,
   (9) synthetic rubber sheet material wrapped around said last named aircraft cable,
   (10) aircraft cable spirally wound under tension around said last named synthetic rubber sheet material,
   (11) synthetic rubber strips placed in gaps between spirally wound aircraft cable,
   (12) synthetic rubber sheet material wrapped around said spirally wound aircraft cable and synthetic rubber strips,
   (13) aircraft cable spirally wound under tension in the opposite direction from said first named spirally wound aircraft cable around said last named synthetic rubber sheet material,
   (14) synthetic rubber strips placed in gaps between said last named spirally wound aircraft cable,
   (15) synthetic rubber sheet material wrapped around said last named spirally wound aircraft cable and synthetic rubber strips,
   (16) polyester fabric wrapped around said last named synthetic rubber sheet material, and
   (17) synthetic rubber sheet material wrapped around said last named polyester fabric.

5. A flexible hose coupling assembly, as set forth in claim 4, in which said nipple means further include flange means secured thereto adjacent the outer end thereof and extending therefrom around the periphery thereof and including a plurality of spaced apertures therein disposed in spaced radially extending pairs around said flange means and cooperating set screw means communicating with at least one of each of said radially extending pairs of apertures, and in which each layer of said spirally wound aircraft cable has the ends of each cable passing through one of said apertures and looped around and through the other of said apertures in a given pair of radially extending apertures in each of said flange means respectively with said set screw means securing the ends of said cables in the apertures of said flange means.

6. Method of forming a flexible hose coupling assembly for use in high pressure rotary drilling rigs, pipe laying rigs, etc., and being specifically constructed to withstand internal pressures up to approximately 6,000 pounds per square inch burst, said method comprising:
   (a) providing a pair of hollow, elongate generally cylindrical, rigid nipple means;

(b) providing a synthetic rubber tube in which the outside diameter is only slightly smaller than the inside diameter of said nipple means;

(c) applying cement to the inside surface of said nipple means;

(d) placing said synthetic rubber tube inside each of said nipple means so that the synthetic rubber tube completely lines the inside surface of said nipple means;

(e) applying cement to the outside surface of said synthetic rubber tube and the outside surface of said nipple means;

(f) applying two plies of synthetic rubber sheet material over said synthetic rubber tube and the outside surface of said nipple means;

(g) compressing the synthetic rubber sheet material and the synthetic rubber tube together to obtain a good bond or adhesion;

(h) applying ten plies of polyester fabric cut on a 45° bias and reversing each ply over said synthetic rubber sheet material;

(i) wrapping copper-coated wire under tension around the end portions of the assembly adjacent said nipple means;

(j) vulcanizing the assembled layers;

(k) applying cement to outside surface of the assembled layers;

(l) applying one ply of synthetic rubber sheet material over said copper-coated wire;

(m) wrapping under pressure aircraft cable around existing layers of materials;

(n) applying cement to existing layers of material;

(o) applying two plies of synthetic rubber sheet material around existing layers of material;

(p) wrapping aircraft cable around existing layers of material;

(q) applying two plies of synthetic rubber sheet material around existing layers of material;

(r) spirally winding aircraft cable under tension around existing layers of material;

(s) filling in gaps between spirally wound air craft cable with strips of extruded synthetic rubber material;

(t) applying one ply of synthetic rubber sheet material around existing layers of material;

(u) spirally winding at an angle in the opposite direction aircraft cable under tension around existing layers of material;

(v) filling in gaps between last named spirally wound aircraft cable with extruded synthetic rubber strips;

(w) applying two plies of bias cut polyester fabric and reversing the direction of each ply around existing layers of material;

(x) applying four plies of synthetic rubber sheet material around existing layers of material; and (y) vulcanizing entire assembly.

References Cited

UNITED STATES PATENTS

| | | | |
|---|---|---|---|
| 2,237,490 | 4/1941 | Knowland | 285—149 |
| 2,241,926 | 5/1941 | Ryan et al. | 285—149 |
| 2,277,397 | 3/1942 | Graham | 285—149 X |
| 2,371,363 | 3/1945 | Smith | 285—149 |
| 2,473,441 | 6/1949 | Muller | 285—149 |
| 2,837,354 | 6/1958 | Thibault et al. | 285—149 |
| 2,854,030 | 9/1958 | Schulthess | 285—239 |
| 3,029,094 | 4/1962 | Parlasca et al. | 285—114 |

THOMAS F. CALLAGHAN, Primary Examiner

U.S. Cl. X.R.

138—109; 156—218

PO-1050
(5/69)

UNITED STATES PATENT OFFICE
CERTIFICATE OF CORRECTION

Patent No. 3,508,768            Dated April 28, 1970

Inventor(s) Joseph R. Hogan

It is certified that error appears in the above-identified patent and that said Letters Patent are hereby corrected as shown below:

Column 5, line 25, "aperatures" should be --apertures--; line 35, after "to" at the end of the line, insert --approximately--. Column 6, line 4, delete "sures" and insert --sufficient strength to withstand internal air pressures--; line 9, "of" should be --to--.

SIGNED AND
SEALED
AUG 25 1970

(SEAL)
Attest:

Edward M. Fletcher, Jr.
Attesting Officer

WILLIAM E. SCHUYLER, JR.
Commissioner of Patents